(12) United States Patent
Cook

(10) Patent No.: US 7,027,571 B1
(45) Date of Patent: Apr. 11, 2006

(54) ACCELERATOR FOR INTELLIGENT VOICE RESPONSE SYSTEM

(75) Inventor: Fred S. Cook, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 40 days.

(21) Appl. No.: 10/274,802

(22) Filed: Oct. 21, 2002

(51) Int. Cl.
  *H04M 1/64* (2006.01)
(52) U.S. Cl. .............. 379/88.17; 379/88.18; 379/93.07; 370/352
(58) Field of Classification Search ......... 379/88.16, 379/88.17, 88.18, 207.14, 93.25, 88.11, 88.23, 379/219, 265.01, 88.01, 93.05, 93.06, 93.07; 707/104.1; 456/414.1
See application file for complete search history.

(56) References Cited

U.S. PATENT DOCUMENTS

| | | | |
|---|---|---|---|
| 5,068,888 A | | 11/1991 | Scherk et al. |
| 5,072,309 A | | 12/1991 | Brown |
| 5,802,526 A | * | 9/1998 | Fawcett et al. .......... 379/88.18 |
| 6,014,428 A | * | 1/2000 | Wolf ........................ 379/88.11 |
| 6,016,336 A | * | 1/2000 | Hanson .................... 379/88.23 |
| 6,157,705 A | * | 12/2000 | Perrone .................... 379/88.01 |
| 6,173,042 B1 | * | 1/2001 | Wu ........................... 379/88.18 |
| 6,427,002 B1 | * | 7/2002 | Campbell et al. ......... 379/88.01 |
| 6,456,699 B1 | * | 9/2002 | Burg et al. ............... 379/88.17 |
| 6,473,505 B1 | * | 10/2002 | Khuc et al. .............. 379/265.01 |
| 6,594,355 B1 | * | 7/2003 | Deo et al. ................ 379/219 |
| 6,594,484 B1 | * | 7/2003 | Hitchings, Jr. ........... 455/414.1 |
| 6,885,737 B1 | * | 4/2005 | Gao et al. ................ 379/93.17 |

OTHER PUBLICATIONS

Montemer, Methods And System For A Distributed Transaction Control System In Enhanced Directory Assistance Services, Jan. 8, 2004.*

* cited by examiner

*Primary Examiner*—Fan Tsang
*Assistant Examiner*—Gerald Gauthier

(57) ABSTRACT

An intelligent voice response (IVR) unit that responds to DTMF tones is connected over a telephone call connection to a user telephone device when a user dials a predetermined telephone number of the IVR unit. An identification of the IVR unit is captured within a supplemental interface device coupled to the user telephone device and to a computer data network. A menu identifier corresponding to the identified IVR unit is transmitted via the computer data network to a name server which stores a pointer to a menu descriptor associated with the IVR unit. The supplemental interface retrieves the menu descriptor corresponding to the IVR unit in response to the pointer. The supplemental interface device graphically displays a multi-level selection menu in response to the menu descriptor.

33 Claims, 5 Drawing Sheets

ACCELERATOR FOR INTELLIGENT VOICE RESPONSE SYSTEM

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to intelligent voice response systems accessed from touch tone telephones, and, more specifically, to an improved user interface to intelligent voice response systems.

Intelligent voice response (IVR) systems provide automated telephone services for receiving incoming telephone calls, playing prerecorded messages and menu prompts, collecting touch tones input by a caller, and executing corresponding computer network actions. IVR technology has been employed in many applications including remote banking, ordering of goods and services (e.g., pay-per-view cable programs), and accessing information from electronic databases (e.g., computer system help topics). The user typically navigates through a multi-level, hierarchical menu by pressing appropriate digits on a touch tone keypad in response to prompts spoken by the IVR system.

IVR systems provide many advantages over other automated access systems such as the Internet. An IVR system provides a totally private and secure interconnection. Furthermore, the only equipment required for the caller is the telephone device itself. Therefore, a desired service can be accessed when no computer network is available.

An IVR unit will typically accept the input of a tone during its reproduction of the current voice prompt, so that a caller can make a selection as soon as it is identified (i.e.; without waiting for the prompt to finish). Unless callers have accessed a particular IVR-based service many times, however, they usually cannot anticipate the current group of choices at any point within a multi-level menu. Therefore, they usually end up listening to all or most of the menu prompts before making their next selection. Depending upon the number of menu levels and the number of choices available at each level, it can take a substantial amount of time to obtain a desired action. Furthermore, if an incorrect choice is made while navigating the menu, it may take several additional steps to back up and return to the point where the mistake was made.

The resulting inefficiency of the typical IVR interface can lead to annoyance and frustration of the caller and increased load on (and increased cost of) the IVR equipment. In an attempt to minimize the time required to navigate a particular menu, voice prompts must be kept as short and concise as possible. However, the resulting prompts can become harder to comprehend. Fuller explanations of menu choices are typically not given because they would require additional complexity within the menu system.

SUMMARY OF THE INVENTION

The present invention has the advantages of reducing user interaction time with IVR systems, reducing load levels on (and thus cost of) IVR equipment, reducing user annoyance and frustration with voice menuing, and providing an ability to more fully explain each voice prompt within a multi-level menu. The invention supplements a conventional IVR system by using a computer data network (e.g., the Internet) to automatically obtain a detailed menu description for graphical display on a supplemental user interface.

In one aspect of the invention, a method is provided for interfacing with an intelligent voice response (IVR) unit responsive to DTMF tones from a user telephone device over a telephone call connection. A user dials a predetermined telephone number to establish the telephone call connection between the user telephone device and the IVR unit. An identification of the IVR unit is captured within a supplemental interface device coupled to the user telephone device and to a computer data network. A menu identifier corresponding to the identified IVR unit is transmitted via the computer data network to a name server which stores a pointer to a menu descriptor associated with the IVR unit. The supplemental interface retrieves the menu descriptor corresponding to the IVR unit in response to the pointer. The supplemental interface device graphically displays a multi-level selection menu in response to the menu descriptor.

DETAILED DESCRIPTION OF PREFERRED EMBODIMENTS

Figure 1:
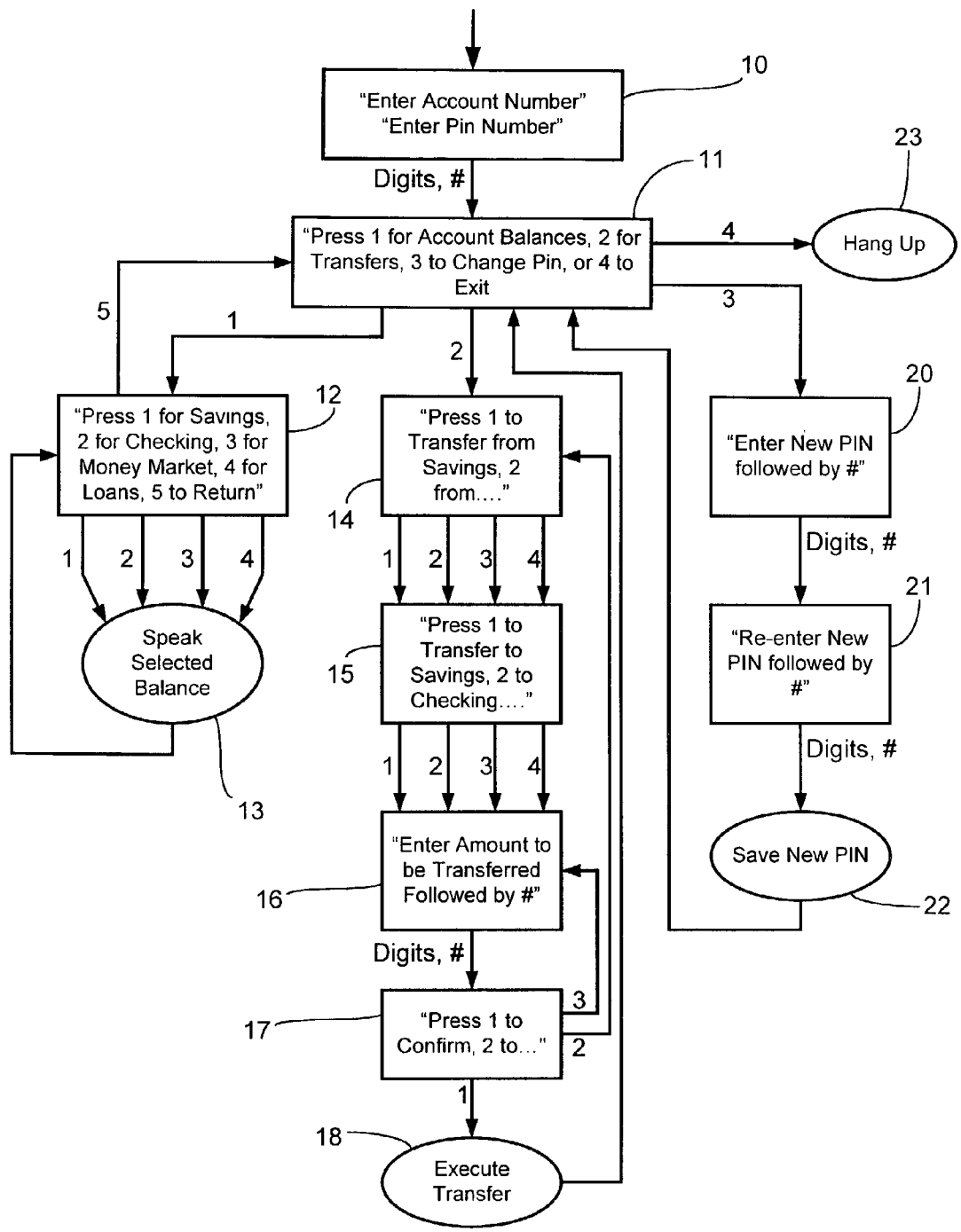
FIG. 1 is an example of a multi-level selection menu.

FIG. 1 shows an example multi-level selection menu available through an IVR unit for a remote banking service. The menu may be navigated in a conventional manner or may be navigated using an improved menu interaction provided by the present invention. When a caller dials a predetermined telephone number for the service, they are connected with an IVR unit that is programmed to present menu prompts as shown. In the menu sequence shown, the caller is first prompted to enter an account number and a personal identification number (PIN) at step 10. Each item of information is typically input by pressing the corresponding numbers on the touch tone keypad of a telephone followed by the pound sign (#). The IVR unit compares the received information with a database of authorized account holders to authenticate the caller. After a valid authentication, the caller gains access to the main menu selections.

At step 11, the voice prompt as shown presents choices for reviewing account balances, transferring funds between accounts, changing a PIN, and exiting. If digit 1 is selected from the keypad, then a next level of the menu is presented at step 12 for selecting the particular account (e.g., savings, checking, money market, or loan). If a digit 1 through 4 is selected, then the corresponding account balance is retrieved and output as synthesized speech by the IVR unit at step 13. If digit 5 is selected then a return is made to the previous level at step 11.

If digit 2 is selected at step 11, then a next level of the menu is presented at step 14 for choosing an account from which to transfer funds. At step 15, the receiving account is chosen. The caller is prompted to enter a monetary amount to be transferred (followed by #) in step 16. The IVR unit plays back the entered transaction and then prompts for confirmation is step 17. The caller may press 1 to confirm, 2 to start over with the transfer, or 3 to re-enter the amount. If digit 1 is pressed, then the IVR unit interacts with the bank's computer network to execute the transfer in step 18 and a return is made to step 11.

If digit 3 is selected from step 11, then a next level of the menu is presented for changing the caller's PIN. The caller is prompted to enter a new PIN is step 20 and to re-enter it in step 21. If the PINs match, then the new PIN is saved in step 22, followed by a return to step 11.

If digit 4 is selected at step 11, then the menu is exited and the IVR unit hangs up the telephone call in step 23.

It can be appreciated from comparing the experience of navigating through the menu using a telephone to hear sequential voice prompts with the ability to see the full menu in FIG. 1, how much more quickly and easily a menu structure can be comprehended when presented in a graphical representation of the various levels and choices at each level. As further described below, the graphical representation also enables a "random access" to a desired menu selection wherein intermediate menu choices are bypassed. The invention uses a supplemental device which holds the entire available menu structure and which has the ability to generate the appropriate tones for communicating a choice to the IVR unit. For example, a user may select the action "Transfer from Savings to Checking" (i.e., avoiding the intermediate steps of selecting Transfer, then selecting the source account, and then selecting the destination account) and the supplemental device automatically plays the DTMF tones of those intermediate selections to navigate to the appropriate point in the IVR menu.

Figure 2:
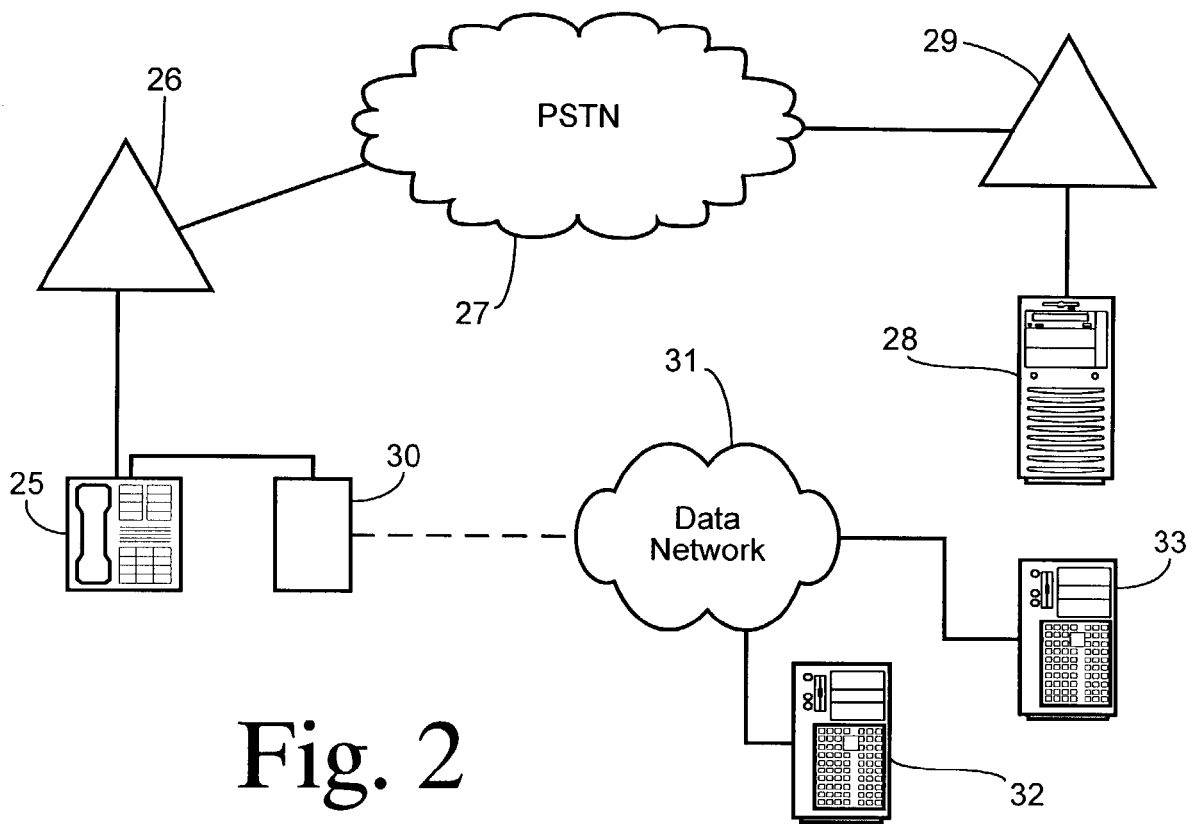
FIG. 2 is a block diagram of a system according to the present invention.

A preferred hardware embodiment of the present invention is shown in FIG. 2. A telephone device 25 (preferably a touch tone device for generating DTMF tones) is coupled to a public switched telephone network (PSTN) 27 via a local exchange carrier (LEC) 26. An IVR unit 28 is coupled to PSTN 27 by a LEC 29. Alternatively, IVR unit 28 could also be coupled to the same LEC as telephone device 25. In addition, telephone device 25 and IVR unit 28 could be interconnected within a private branch exchange (PBX) or any other known telephone connection method.

Telephone device 25 establishes a telephone call connection with IVR unit 28 by dialing a predetermined telephone number associated with the IVR unit. The IVR unit is programmed to answer a call and provide a conventional automated service.

A supplemental interface device 30 is coupled to telephone device 25 by splitting of the telephone line, for example. Supplemental interface device 30 is comprised of a graphic display device capable of communicating in a computer data network. It is coupled to a data network 31 (e.g., the Internet) to which a name server 32 and a menu server 33 are also connected. Preferably, a plurality of menu servers may be deployed throughout data network 31.

In operation, supplemental interface device 30 captures an identification of IVR unit 28 contemporaneously with the establishment of the telephone call connection. Supplemental interface device 30 may automatically collect the dialed digits of the telephone number of IVR unit 28 as they are dialed or the caller can manually input the identification into supplemental interface device 30. A resulting "menu identifier" is generated by supplemental interface device 30 (e.g., the collected phone number is normalized to a full 10-digit form).

The menu identifier is transmitted to name server 32 which is a "DNS-like" server that stores pointers associating various IVR units or IVR services (as identified by the telephone number or name received from device 30) with various menu server locations (i.e., network addresses and file names) for respective menu descriptors (i.e., menuing control code) defined in advance for elaborating the programmed menus of the associated IVR units. Since multiple IVR units may have identical menu structures, there may be multiple menu identifiers pointing to the same menu descriptor. Thus, name server 32 may perform a translation of a telephone number or other identifier into a network location. Existing DNS server packages could be used to implement name server 32, but are not required.

A menu descriptor file or files are created for a particular menu structure used by an IVR unit or service and stored in menu server 33. The files can contain executable objects, scripts, graphics, and text. A menu identifier and the location of the menu descriptor file(s) are then stored in name server 32 so that they can be retrieved by supplemental interface device 30.

In response to a request from supplemental interface device 30, name server 32 looks up the menu identifier in its database and returns the corresponding pointer(s). Supplemental interface device 30 then accesses the menu descriptor(s) via data network 31 and displays a multi-level selection menu to expedite the user's interaction with the menuing system of IVR 28.

Figure 3:
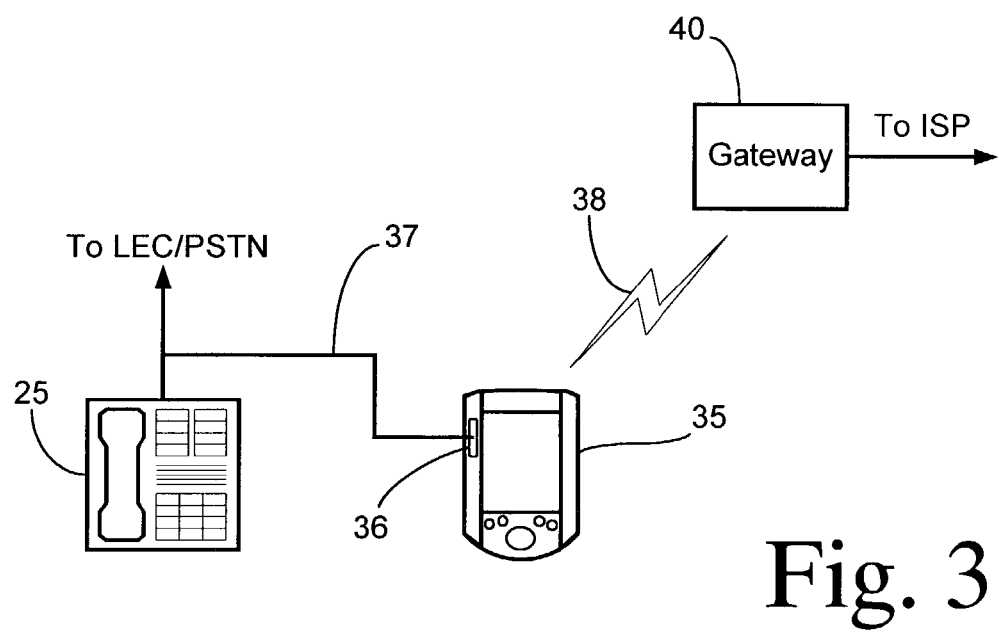
FIG. 3 is a block diagram of customer premises equipment in one embodiment of the present invention.

FIG. 3 shows a preferred embodiment wherein the supplemental interface device is comprised of a handheld computer or personal digital assistant (PDA) 35. PDA 35 includes a telephone modem 36 (e.g., a modem card in an expansion or PCMCIA slot) connected to telephone line 37. Modem 36 has the capability to both detect and generate DTMF tones on phone line 37. Thus, modem 36 can be set to passively listen to phone line 37 in order to automatically collect the dialed telephone number of an IVR unit. PDA 35 preferably also includes a wireless computer network connection 38, such as an IEEE 802.11 wireless connection, to a gateway 40 for connecting to an Internet service provider (ISP) via a cable modem, DSL modem, or dial-up service, for example. PDA 35 transmits the dialed digit string (after normalizing if necessary) to the name server at a preconfigured network address. A pointer is returned to PDA 35 via gateway 40 and then PDA 35 accesses the file indicated by the pointer. In addition to displaying the menu hierarchy on the PDA display, the user can select locations within the menu levels and modem 36 can generate the corresponding sequence of DTMF tones on phone line 37 for transmission via the telephone system to the IVR unit. The DTMF tone sequence can traverse through a menu tree or hierarchy very quickly by bypassing the intervening voice prompts.

A convenient approach for the present invention is to create menu descriptor files in the form of HTML files for accessing by PDA 35 using a web browser. In one embodiment, various HTML screens can be hyperlinked together for navigating in response to selecting numbers on the PDA screen (i.e., corresponding to the buttons on a touch tone keypad) so that PDA 35 automatically shows the next menu selections after generating the DTMF tone(s) for the current screen. In addition, PDA 35 may "listen" for any DTMF tones generated by telephone 25 and can link to a corresponding screen in response to any such selections.

Figure 4:
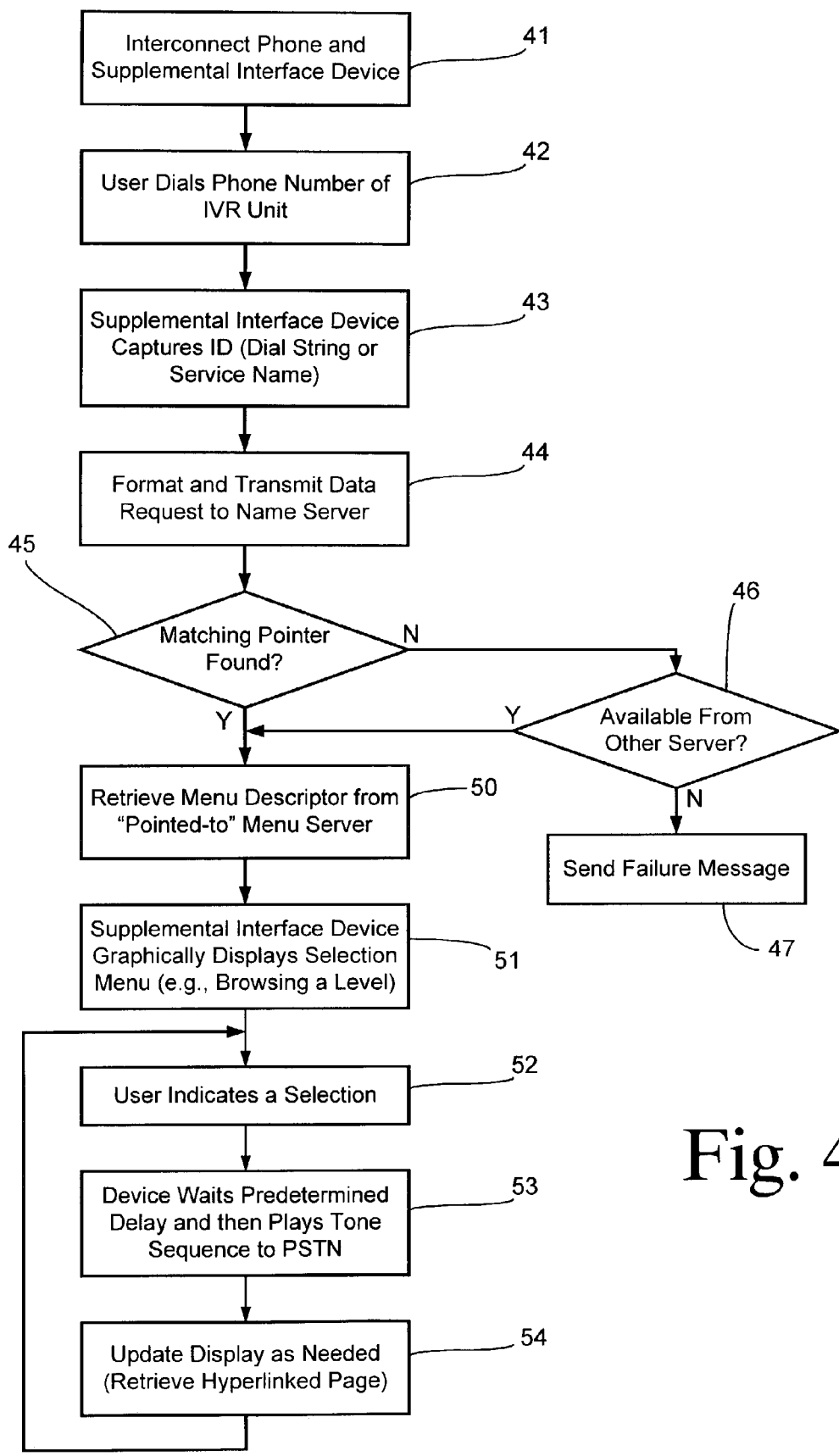
FIG. 4 is a flowchart showing a preferred method of the present invention.

A preferred method of the present invention is shown in greater detail by the flowchart of FIG. 4. In step 41, the telephone device is interconnected with the supplemental interface device. The user dials the telephone number of an IVR unit in step 42. In step 43, the supplemental interface device captures an identification of the IVR unit, e.g., by capturing the dial string via a modem. Alternatively, the user could manually input the telephone number using input elements (e.g., a touch screen) of the supplemental interface device. The user could also input an alphanumeric service name which could be translated into a telephone number by using a service name database (located either in the supplemental interface device or the menu server) or the alphanumeric service name could be used directly by the menu server as the IVR menu identifier. Using any of the foregoing forms of the IVR menu identifier, the supplemental interface device formats and transmits a data request to the menu server in step 44. For example, the IVR menu identifier is entered into a web browser's address bar, either manually or automatically. The browser attempts to resolve the "name" in the address bar by contacting the name server at a preconfigured address.

In step 45, the name server (i.e., a DNS-like server) receives the menu identifier and checks whether it has stored a corresponding pointer to a menu server (e.g., network address and file name). If not, then it checks in step 46 whether a pointer to the menu descriptor is available from other servers connected in the data network (e.g., servers maintained by other service providers). If still not available, then a failure message is returned to the supplemental interface device in step 47. Otherwise, when the corresponding pointer is found in step 45 or 46, it is transmitted to the supplemental interface device. Using the returned pointer, the browser loads and executes an HTML file corresponding to the beginning point of the menu of the corresponding IVR unit. By executing the HTML file, the PDA display shows explanatory text, selection buttons and labels, and navigation buttons, for example. In an alternative embodiment using specialized software, the menu descriptor may be comprised of a data file that describes the menu hierarchy or structure and contains labels for the structure and additional description information or help text for display by the supplemental interface device.

In step 51, the supplemental interface device displays a selection menu with the labels. If the entire menu structure does not fit on one screen of the supplemental interface device, then the graphical display screen may be scrolled, for example.

In one embodiment, the caller consults the graphical display in order to determine the digit sequence leading to their desired action and then the caller manually inputs that digit sequence using the touch tone keypad without having to listen to voice prompts. In a more preferred embodiment, the supplemental interface device is used to generate DTMF tone sequences automatically. Thus, the user indicates a selection within the displayed menu tree in step 52 (e.g., by tapping on the corresponding label in the PDA display). In step 53, the supplemental interface device may wait until audio is detected on the line from the IVR unit or may wait for a predetermined delay since sending the last DTMF signal in order to ensure that the IVR unit is ready to accept an input tone. Alternatively, a handshake signal may be exchanged with the IVR unit. After waiting, the supplemental interface device plays the tone sequence over the PSTN to the IVR unit. The user is able to traverse the menu one level at a time (so that each tone sequence includes a single tone) or several levels at once (so that each tone sequence includes a series of tones).

The IVR unit responds to the tone sequence in a conventional manner. Simultaneously, the display of the supplemental interface device is updated in step 54 as necessary to reflect the then current location within the levels of the menu hierarchy and a return is made to step 52. The updating of the display may comprise the loading of a new HTML file for a new page by hyperlinking in response to the previous selection.

Figure 5:
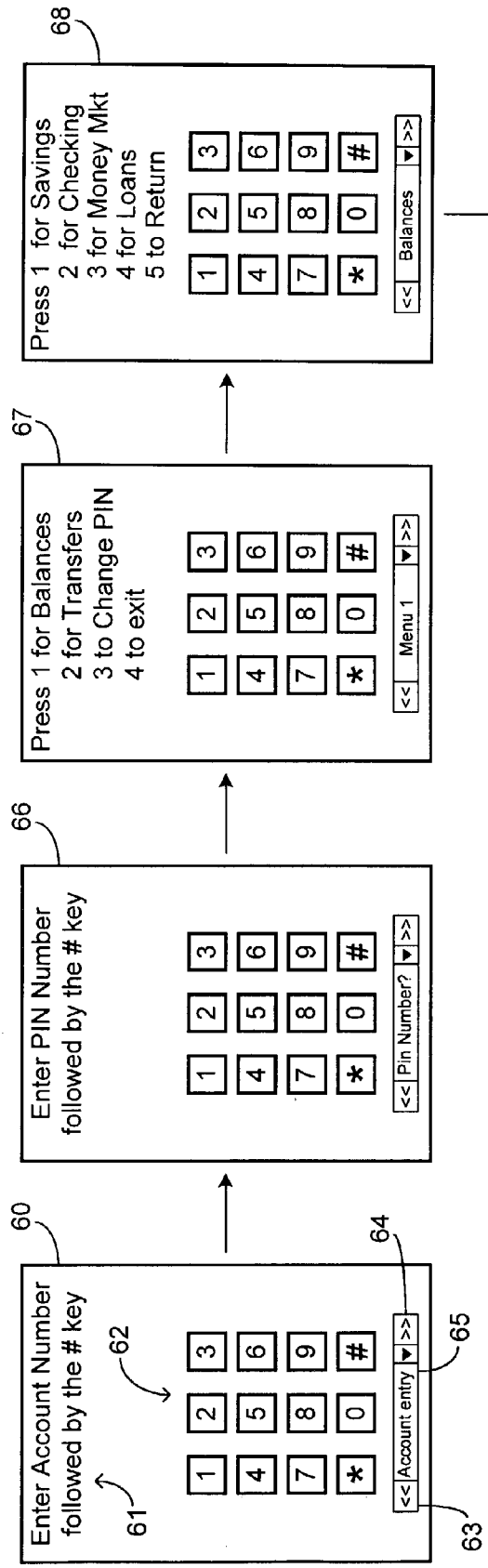
FIG. 5 shows successive browser screens on a display of handheld computing device in accordance with a preferred embodiment of the present invention.
Figure 5:
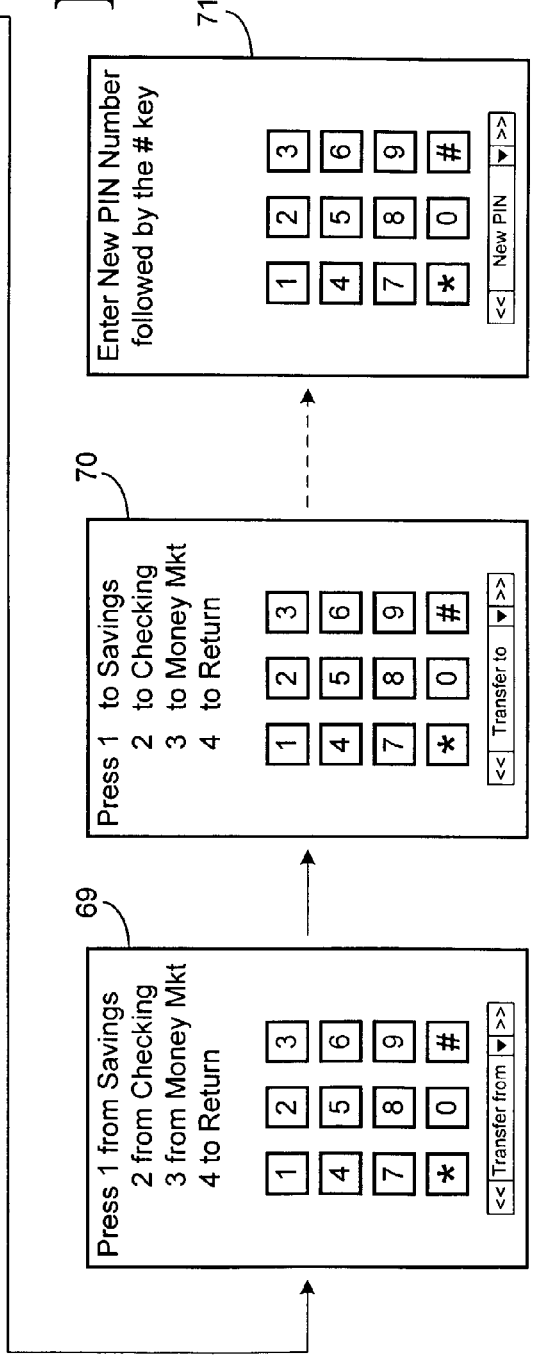

FIG. 5 shows a series of HTML-generated screens produced by menu descriptor HTML files. A first screen 60 corresponds to the initial menu choices when calling the IVR unit and is produced by an HTML file which is pointed to by the name server. Screen 60 has a text area 61 and a touch-tone button area 62. Selections within the current menu choices can be obtained by activating a button in area 62. Other points in the overall menu structure can be accessed via a scroll-backward button 63, a scroll-forward button 64, or a pulldown box 65. Initially, pulldown box 65 shows a label corresponding to the current screen.

In screen 60, the user may enter their account number followed by the # key. Upon activating the # key, a hyperlink is executed leading to a screen 66 for inputting the user's PIN number. A main menu is then presented by hyperlinking to a screen 67 which presents all the available choices in text. Other screens 68–71 correspond to other positions in the menu tree of FIG. 1. Screens 60 and 66–71 may be displayed using a PDA 35 as shown in FIG. 6.

Figure 6:
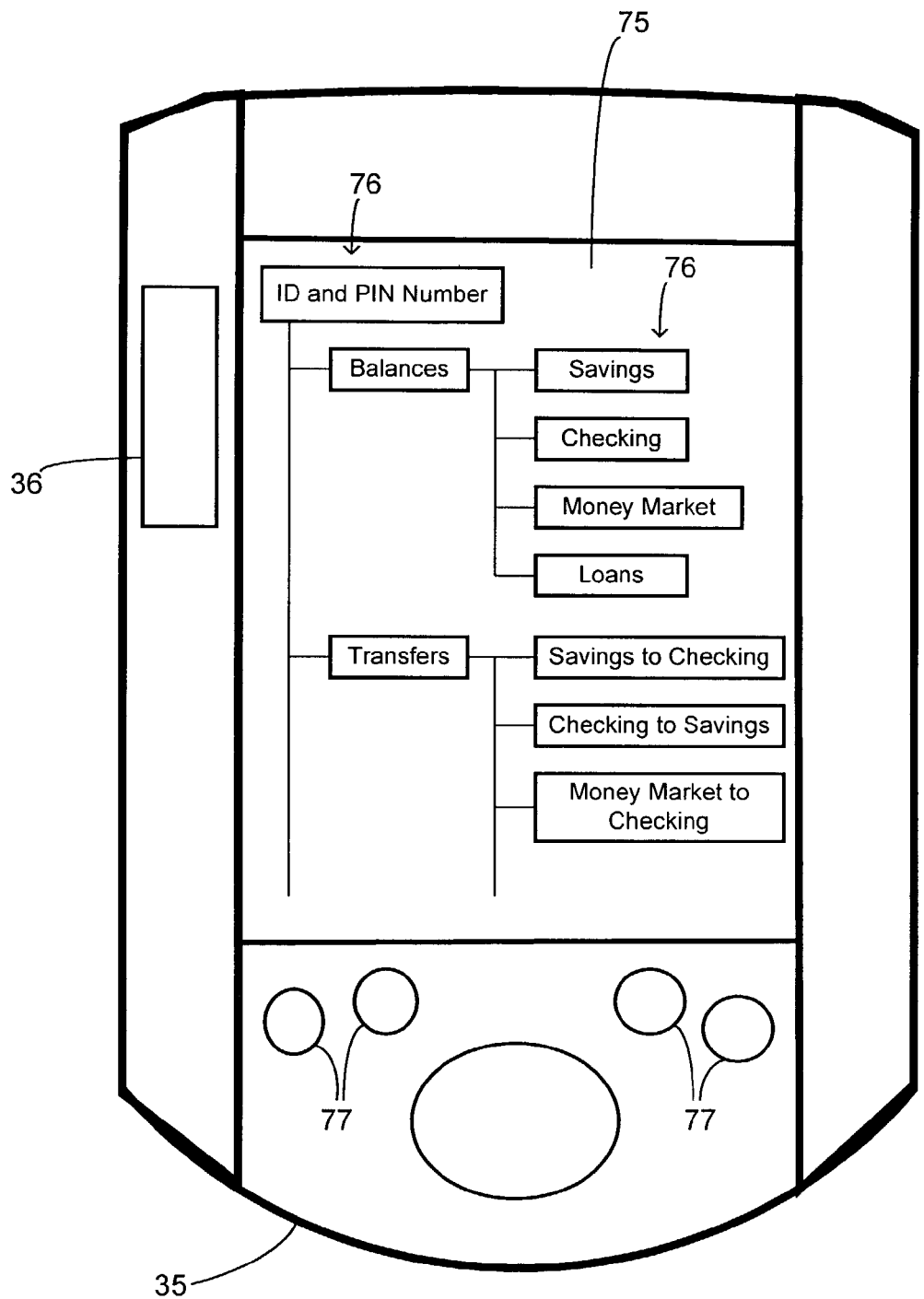
FIG. 6 shows an alternative embodiment for displaying a menu.

In FIG. 6, a touch-screen display 75 as commonly used on PDA devices displays a multi-level selection menu corresponding to the remote banking service of FIG. 1. The menu is displayed using an alternative embodiment wherein specialized software and menu descriptor files provide a customized representation on screen. The selection menu includes a plurality of action buttons 76 each containing a corresponding label as defined by the menu descriptor file. Touch screen 75 is tapped at the location of an action button to initiate the corresponding action. For example, a user indicates a menu selection by tapping an action button 76 labeled "Checking" in order to hear the user's checking account balance. PDA 35 then generates the tone sequence to select the "Balances" and "Checking" choices in series. Input elements 77, a special area of the touch-screen display, or an expansion keyboard could be used to enter alphanumeric data as needed by PDA 35 to construct tone sequences requiring user input data (such as user account number and PIN).

What is claimed is:

1. A method of interfacing with a selected one of a plurality of intelligent voice response (IVR) units responsive to DTMF tones from a respective user telephone device over a respective telephone call connection, said method comprising the steps of:

a user dialing a predetermined telephone number to establish said telephone call connection between said user telephone device and said selected IVR unit;

capturing an identification of said selected IVR unit within a supplemental interface device coupled to a computer data network;

transmitting a menu identifier corresponding to said selected IVR unit via said computer data network to a name server which stores a plurality of pointers each pointing to a respective menu descriptor for a corresponding IVR unit, said pointers including a respective pointer to a respective menu descriptor associated with said selected IVR unit;

transmitting said respective pointer to said supplemental interface device;

said supplemental interface retrieving said respective menu descriptor corresponding to said selected IVR unit in response to said respective pointer; and said supplemental interface device graphically displaying a multi-level selection menu in response to said respective menu descriptor.

2. The method of claim 1 wherein said respective menu descriptor provides labels for available actions at each level of said multi-level selection menu.

3. The method of claim 1 wherein said respective menu descriptor is comprised of an HTML file representing at least a portion of said multi-level selection menu.

4. The method of claim 1 wherein said respective menu descriptor is comprised of a plurality of linking HTML files for browsing using said supplemental interface.

5. The method of claim 1 further comprising the steps of:
said user indicating a menu selection within said multi-level selection menu via said supplemental interface device; and
said supplemental interface device generating a corresponding DTMF tone sequence for transmission via said telephone call connection to said selected IVR unit.

6. The method of claim 1 further comprising the steps of:
said user indicating a menu selection via said user telephone device;
capturing said indicated menu selection in said supplemental interface; and
said supplemental interface device updating said graphic display.

7. The method of claim 5 further comprising the step of:
exchanging handshake signals between said selected IVR unit and said supplemental interface device to indicate readiness of said selected IVR unit to receive said DTMF tone sequence.

8. The method of claim 5 wherein said DTMF tone sequence is comprised of a single DTMF tone for navigating one level of said multi-level selection menu.

9. The method of claim 5 wherein said DTMF tone sequence is comprised of a series of DTMF tones for traversing a plurality of levels of said multi-level selection menu.

10. The method of claim 1 wherein said supplemental interface device simultaneously displays a plurality of levels of said multi-level selection menu.

11. The method of claim 1 wherein said pointer points to a menu server storing said plurality of menu descriptors corresponding to said plurality of IVR units, each IVR unit identified by a respective menu identifier.

12. The method of claim 1 wherein said respective menu identifier is comprised of an alphanumeric representation of said predetermined telephone number that was dialed.

13. The method of claim 12 further comprising the step of:
collecting digits within said supplemental interface device corresponding to said dialed predetermined telephone number.

14. The method of claim 1 wherein said respective menu identifier is comprised of an alphanumeric representation of a service name corresponding to said selected IVR unit.

15. The method of claim 14 wherein said respective menu identifier is manually identified to said supplemental interface device by said user.

16. The method of claim 1 wherein said supplemental interface device is comprised of a personal digital assistant (PDA).

17. The method of claim 1 wherein said computer data network comprises the Internet.

18. A system for interfacing with a selected one of a plurality of intelligent voice response (IVR) units which is responsive to DTMF tones received over a telephone call connection, said system comprising:
a user telephone device for dialing a predetermined telephone number to establish said telephone call connection between said user telephone device and said selected IVR unit;
a supplemental interface device coupled to said user telephone device and to a computer data network for capturing an identification of said selected IVR unit;
a menu server coupled to said computer data network and storing a plurality of menu descriptors associated with said IVR units; and
a name server coupled to said computer data network and storing a plurality of pointers pointing to said menu descriptors in said menu server;
wherein said supplemental interface transmits a menu identifier corresponding to said selected IVR unit via said computer data network to said name server, wherein said name server retrieves a respective pointer and transmits said respective pointer to said supplemental interface, wherein said supplemental interface device retrieves a respective menu descriptor corresponding to said selected IVR unit in response to said respective pointer, and wherein said supplemental interface device graphically displays a multi-level selection menu in response to said respective menu descriptor.

19. The system of claim 18 wherein said respective menu descriptor provides labels for available actions at each level of said multi-level selection menu, and wherein said supplemental interface device displays said labels.

20. The system of claim 18 wherein said respective menu descriptor is comprised of an HTML file representing at least a portion of said multi-level selection menu.

21. The system of claim 18 wherein said respective menu descriptor is comprised of a plurality of linking HTML files for browsing using said supplemental interface.

22. The system of claim 18 wherein said supplemental interface device provides an input element to allow said user to indicate a menu selection within said multi-level selection menu, and wherein said supplemental interface device generates a DTMF tone sequence corresponding to said menu selection for transmission via said telephone call connection to said selected IVR unit.

23. The system of claim 18 wherein said user indicates a menu selection via said user telephone device, wherein said supplemental interface captures said indicated menu selection, and said supplemental interface device updates said graphic display.

24. The system of claim 22 wherein said supplemental interface device and said selected IVR unit exchange handshake signals to indicate readiness of said selected IVR unit to receive said DTMF tone sequence.

25. The system of claim 22 wherein said DTMF tone sequence is comprised of a single DTMF tone for navigating one level of said multi-level selection menu.

26. The system of claim 22 wherein said DTMF tone sequence is comprised of a series of DTMF tones for traversing a plurality of levels of said multi-level selection menu.

27. The system of claim 18 wherein said supplemental interface device includes a display for simultaneously displaying a plurality of levels of said multi-level selection menu.

28. The system of claim 18 wherein said respective pointer points to a menu server storing said plurality of menu descriptors, each of said IVR units identified by a respective menu identifier.

29. The system of claim 18 wherein said supplemental interface device includes a digit collector for capturing said dialed predetermined telephone number.

30. The system of claim 18 wherein said supplemental interface device includes an input element for manually indicating said menu identifier as an alphanumeric representation of a service name corresponding to said selected IVR unit.

31. The system of claim 18 wherein said supplemental interface device is comprised of a personal digital assistant (PDA).

32. The system of claim 18 wherein said computer data network comprises the Internet.

33. A method of operating a menu server within a computer data network, comprising the steps of:
   maintaining a plurality of menu descriptors for a plurality of IVR units coupled to a telephone network, each menu descriptor corresponding to graphical display of a respective multi-level selection menu of a respective IVR unit accessible to users only via telephone call connections from user telephone devices;
   receiving a query from a computing device via said computer data network for a particular menu descriptor corresponding to one of said IVR units being accessed by one of said users via said telephone network; and
   transmitting said selected menu descriptor to said computing device via said computer data network for graphical display on said computing device.

* * * * *